United States Patent
Rafalski, Jr.

[15] 3,635,503
[45] Jan. 18, 1972

[54] BAND CLAMP WITH SERVICE OUTLET

[72] Inventors: Michael J. Rafalski, Jr., 602 S. Falcon St. Blase G. Celmer, 506 Koszciuszko St., both of South Bend, Ind. 46619

[22] Filed: Dec. 23, 1969
[21] Appl. No.: 887,639

[52] U.S. Cl............................................................285/197
[51] Int. Cl.................................................F16l 41/02
[58] Field of Search..................285/197, 198, 199; 277/208

[56] References Cited

UNITED STATES PATENTS

| | | |
|---|---|---|
| 1,967,466 | 7/1934 | Damsel..........................277/208 X |
| 3,284,109 | 11/1966 | Parker..............................285/197 |
| 3,355,193 | 11/1967 | Craig et al. .......................285/197 |
| 3,355,794 | 12/1967 | Adams..........................285/197 X |
| 3,472,537 | 10/1969 | Paterson..........................285/197 |

*Primary Examiner*—Thomas F. Callaghan
*Attorney*—William N. Hogg

[57] ABSTRACT

A service outlet is provided in a flexible band clamp by forming an aperture through the band. The band is inwardly depressed around the aperture and a threaded fitting is disposed in the recess formed by the depression and welded therein. The gasket of the clamp also is provided with an aperture aligned with the aperture in the band.

6 Claims, 5 Drawing Figures

PATENTED JAN 18 1972
3,635,503
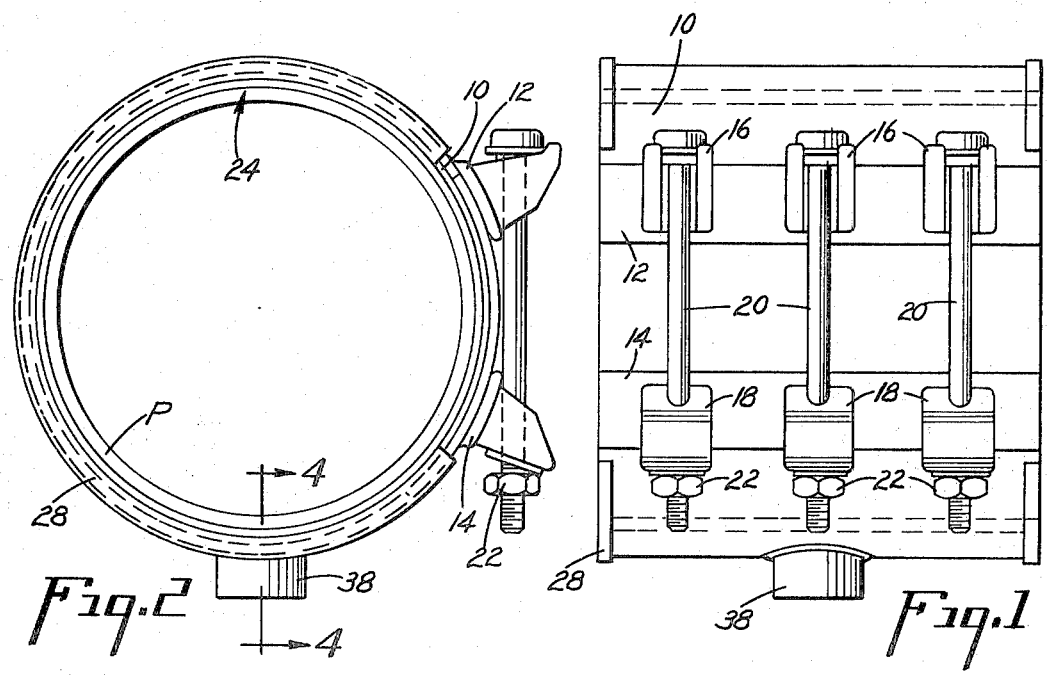
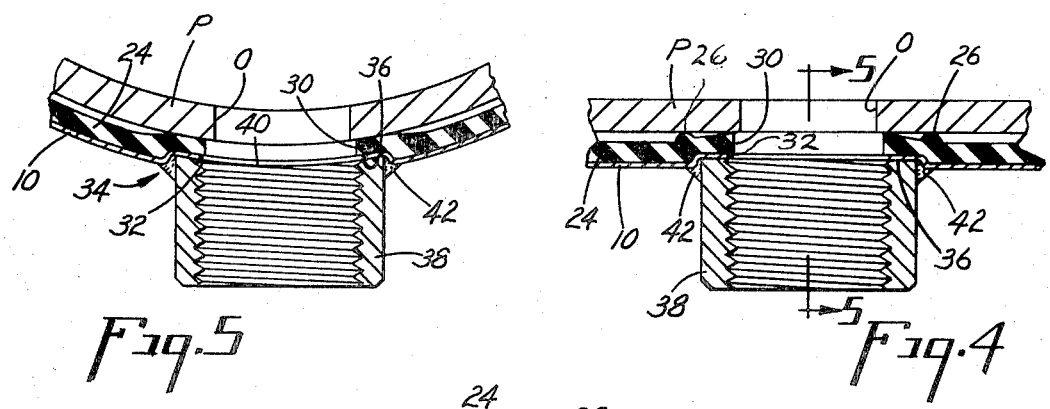
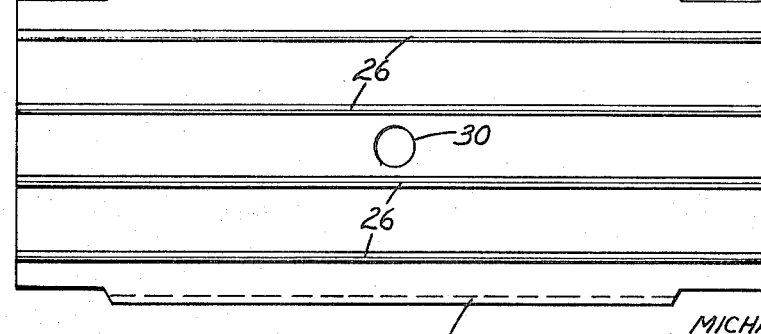
MICHAEL J. RAFALSKI JR.
BLASE G. CELMER
INVENTORS
BY J. D. Douglas
their ATTORNEY

BAND CLAMP WITH SERVICE OUTLET

BACKGROUND OF THE INVENTION

This invention relates generally to flexible band clamps, and more particularly to flexible band clamps with service outlet connections.

In fluid distribution systems employing a main pipeline for conducting fluids, it is often desirable to connect the main pipeline with a service pipeline having a smaller diameter than the main line. These connections are made with fittings disposed to deliver fluid from the main pipe. However, these fittings often develop leaks due to corrosion or they are damaged in some manner, causing them to leak. When such leaks occur, the fittings must either be repaired or replaced. One common type of device which may be useful for initially forming connections, or for replacement of a damaged or leaking fittings, is a full-circle band clamp with a service outlet connection.

The prior art proposals for these band clamps with the service outlet connections have provided an aperture in the band, in which is disposed a service outlet connection. One of the problems of the prior art is the tendency of the connection to leak in the region of the service outlet. In order to overcome this tendency or propensity toward leaking, there have been several prior art proposals for forming service connections with specially shaped bases disposed within the flexible band. Also, additional gaskets have been provided within the band surrounding a service connection area to reduce the tendency to leaking. These solutions, while offering some improvement against leaking are somewhat expensive because of the specially shaped and configured components required, and also the additional parts required often present maintenance problems and do not even then provide an entirely satisfactory solution to the problem of leakage.

SUMMARY OF THE PRESENT INVENTION

According to the present invention, an improved service connection clamp of the flexible band type is provided having a service outlet configuration which is extremely resistant to leaking and yet which is simple and economical to manufacture. To provide the service outlet connection, an aperture is formed in the band and an aligned aperture is formed in the gasket within the band. The band is deformed inwardly around the aperture to form a depression therein. Connector means preferably in the form of an internally threaded tubular member is disposed within the depression and secured therein preferably by welding. The inward deformation of the flexible band results in a structure which provides increased sealing pressure of the gasket against the pipe in the region around the depression to thereby reduce the tendency of leakage in this region.

BRIEF DESCRIPTION OF THE DRAWING

FIG. 1 is a side elevational view of a service connection clamp according to this invention;

FIG. 2 is an end elevational view of the device of FIG. 1, applied to a pipe;

FIG. 3 is a view of the gasket utilized in the service connection clamp laid flat;

FIG. 4 is a sectional view taken substantially along the plane designated by the line 4—4 of FIG. 2; and FIG. 5 is a sectional view taken substantially along the plane designed by the line 5—5 of FIG. 4.

DESCRIPTION OF THE PREFERRED EMBODIMENT

Referring now to the drawing and for the present to FIGS. 1 and 2, a service connection clamp according to the present invention is shown. The clamp includes a flexible flat metal band member 10. A pair of block members 12 and 14 are secured to the opposite sides of the band member 10 and are provided respectively with upwardly extending bolt-engaging lugs 16 and 18. These lugs are disposed to engage clamping bolts 20 extending therebetween. The clamping bolts 20 are provided with nuts 22 threaded on the ends thereof and in tightening the nuts, the blocks 12 and 14 can be drawn together, thereby tightening the flexible band. This structure is shown and described in copending U.S. Pat. application Ser. No. 836,910 filed June 26, 1969 entitled "Pipe Repair Clamp."

Disposed within the flexible band 10 and secured to the opposite edges thereof is a gasket member designated generally as 24. This gasket member is similar in construction to that shown in U.S. Pat. application Ser. No. 836,800 filed June 26, 1969 entitled "Sealing Gasket for Pipe Repair Clamp." The gasket 24 is shown in detail in FIG. 3 and includes a plurality of circumferentially extending sealing ribs 26, and band-engaging lips 28 formed on opposite sides of the gasket. The band-engaging lips maintain the gasket in proper position in the band and when so positioned, the beads 26 are disposed so that the opposite ends of the beads 26 will be in substantial alignment, thus providing a continuous annular sealing chambers as more fully described in said application, Ser. No. 836,800.

In order to provide for a service outlet connection, an aperture 30 is formed in the gasket 24, and as can best be seen in FIG. 3, this aperture 30 is formed between two adjacent sealing beads 26.

As can best be seen in FIGS. 4 and 5, the flexible band 10 is provided with an aperture 32 which is slightly larger than the aperture 30 in the gasket and generally aligned therewith when the gasket is disposed in the band. The band 10 is deformed inwardly around the aperture 32 to form a depression 34 which has an end wall 36. Disposed within the depression 34 and engaging the end wall 36 is a generally tubular connector fitting 38. The fitting of 38 is threaded internally and has a generally arcuate-shaped base wall 40. The arcuate configuration of this wall 40 substantially conforms to the arcuate configuration in the circumferential direction of the flexible band 10, thereby conforming to the shape of the end wall 36 when the band is bent. The fitting 38 is welded to the band as shown at 42 to provide a secure connection between the fittings 38 and the band 10.

To utilize the clamp, the nuts 22 are loosened on the bolts 20, and the clamp is slipped over the pipe to which the connection is to be made. The pipe is shown and designated as P in FIGS. 2, 4 and 5, and an opening to the interior of the pipe is shown in FIGS. 4 and 5 and designated as O. The clamp is adjusted so that the opening 30 in the gasket, and hence the fitting 38, are in alignment with the opening O in the pipe, and the opening 30 is disposed so that it completely surrounds the opening O in the pipe. The nuts 22 are then tightened on the bolts 20 causing a radially inwardly direct force to be exerted against the gasket, which in turn produces a radially inwardly directed force against the pipe P.

Because the band 10 is deformed inwardly in the region of the opening 32, the gasket 24 in the region of this inward deformation is displaced inwardly from the remainder of the gasket. Because of this inward displacement, a higher clamping force is developed around this area of the gasket.

Thus, in effect, this inward deformation provides a generally inwardly projecting annular ring of gasket material in the region surrounding the opening O which is effective to provide a much better sealing configuration. The tightness of this inherent sealing configuration eliminates the need for any special shaped bases or bosses on the fitting 38, and also eliminates the need of any separate sealing gaskets around the opening O. Thus, a simple, straight, internally threaded pipe section cut to an arcuate end shape can be utilized to provide the fitting for the connection and provide an effective seal around the service outlet in the pipe.

We claim:

1. A service connection clamp comprising a flexible thin wall band, lug means disposed to tighten the band, a band-type gasket disposed internally of the band for contact with a pipe, said band and said gasket having aligned openings therein, said band being permanently deformed inwardly around said opening therein to form an inwardly projecting annular ring depression around said opening resistant to distortion under pressure, the thickness of the band deformed inwardly being substantially the same as the remainder of the band, said inward deformation of said band causing a corresponding inward deformation in said gasket upon firm contact between the band and gasket, said inward deformation of said gasket providing an annular sealing ring of increased pressure by said deformed gasket around a given surface of the pipe when the clamp is applied, connection means having an outlet therein aligned with the openings in the band and gasket, said connection means being disposed entirely outwardly of the outer surface of said band, and means securing said connection means to said band.

2. The invention as defined in claim 1 wherein said connection means is disposed in said depression.

3. The invention as defined in claim 2 wherein said depression has bottom wall means disposed to engage and support one end of the connection means.

4. The invention as defined in claim 3 wherein said connection means includes an annular, internally threaded member.

5. The invention as defined in claim 4 wherein said one end of the connection means has an arcuate configuration oriented in the circumferential direction of the band.

6. The invention as defined in claim 1 wherein said gasket has a plurality of circumferentially extending sealing beads, and wherein said opening in said gasket is located between two of said beads.

* * * * *